US011493099B2

United States Patent
Sakuyama (10) Patent No.: US 11,493,099 B2
(45) Date of Patent: Nov. 8, 2022

(54) ONE-WAY CLUTCH, DRIVE TRANSMISSION UNIT USING THIS ONE-WAY CLUTCH, AND INKJET PRINTING APPARATUS USING THIS DRIVE TRANSMISSION UNIT

(71) Applicant: CANON FINETECH NISCA INC., Saitama (JP)

(72) Inventor: Masayoshi Sakuyama, Nagareyama (JP)

(73) Assignee: Canon Finetech Nisca Inc., Saitama (JP)

(*) Notice: Subject to any disclaimer, the term of this patent is extended or adjusted under 35 U.S.C. 154(b) by 62 days.

(21) Appl. No.: 17/177,015

(22) Filed: Feb. 16, 2021

(65) Prior Publication Data

US 2021/0262534 A1 Aug. 26, 2021

(30) Foreign Application Priority Data

Feb. 26, 2020 (JP) .............................. JP2020-030664
Jan. 12, 2021 (JP) .............................. JP2021-002888

(51) Int. Cl.
*F16D 41/18* (2006.01)
*B41J 29/38* (2006.01)
*F16D 23/12* (2006.01)

(52) U.S. Cl.
CPC ............ *F16D 41/185* (2013.01); *B41J 29/38* (2013.01); *F16D 23/12* (2013.01); *F16D 2023/123* (2013.01)

(58) Field of Classification Search
CPC .. F16D 41/185; F16D 23/12; F16D 2300/123; F16D 43/20; F16D 43/202; B41J 29/02; B41J 29/38
See application file for complete search history.

(56) References Cited

U.S. PATENT DOCUMENTS

| 2015/0117918 A1* | 4/2015 | Suzuki | G03G 21/1857 |
| | | | 399/329 |
| 2015/0212456 A1* | 7/2015 | Imaizumi | B65H 5/062 |
| | | | 74/665 G |
| 2017/0106660 A1* | 4/2017 | Mizusaki | F04B 43/086 |

FOREIGN PATENT DOCUMENTS

JP 2002-087611 3/2002

* cited by examiner

*Primary Examiner* — David R Morris
*Assistant Examiner* — Lori Wu
(74) *Attorney, Agent, or Firm* — Venable LLP (57) ABSTRACT

A one-way clutch including: a driving force input member; a driving force output member; and a driving force transmitting member, wherein, when the driving force input member performs forward rotation, the second engaging part performs forward rotation in a state of being engaged with the first engaging part, so as to connect the first ratchet engaging part and the second ratchet engaging part, in order to make the driving force output member perform forward rotation, wherein, when the driving force input member performs reverse rotation, the second engaging part performs reverse rotation in a state of being engaged with the first engaging part, so as to make the driving force transmitting member and the first ratchet engaging part perform reverse rotation so that the first ratchet engaging part is separated from the second ratchet engaging part, in order not to make the driving force output member perform reverse rotation.

6 Claims, 9 Drawing Sheets

ONE-WAY CLUTCH, DRIVE TRANSMISSION UNIT USING THIS ONE-WAY CLUTCH, AND INKJET PRINTING APPARATUS USING THIS DRIVE TRANSMISSION UNIT

BACKGROUND OF THE INVENTION

Field of the Invention

The present invention particularly relates to a one-way clutch including a driving force transmitting member that is movable in the thrust direction between a driving force input member and a driving force output member, a drive transmission unit using this one-way clutch, and an inkjet printing apparatus using this drive transmission unit.

Description of the Related Art

Conventionally, there has been a one-way clutch which includes a driving force transmitting member that is movable in the thrust direction between a driving force input member and a driving force output member.

Regarding such a one-way clutch, since the driving force transmitting member can freely move in the thrust direction, there has been a problem that the operation state changes depending on the thrust direction in which the one-way clutch is installed. Specifically, although such a one-way clutch normally operates in a case where this thrust direction is perpendicular to the gravity direction, there has been a possibility that, in a case where the thrust direction is parallel to the gravity direction, the driving force transmitting member cannot move against the gravity.

Therefore, according to the description in Japanese Patent Laid-Open No. 2002-87611, an arm with a protrusion part is disposed at an inner circumferential part of a driving force transmitting member, which is movable in the thrust direction between a driving force input member and a driving force output member, and the driving force input member and the driving force transmitting member are fitted together by insertion a cylindrical member of the driving force output member. When the driving force transmitting member moves in the thrust direction, bias force that is greater than the load caused by the own weight of the driving force transmitting member is generated between the cylindrical member of the driving force output member and the driving force transmitting member by the protrusion part disposed on the arm of the driving force transmitting member. Accordingly, it is possible to eliminate the possibility that the gravitational influence on the driving force transmitting member differs depending on the thrust direction in which the one-way clutch is installed, so that stable operation can be performed without changing of the operation state.

However, in Japanese Patent Laid-Open No. 2002-87611, there is only one protrusion part disposed on the arm of the driving force transmitting member (see FIG. 1), which is poor in balance, and there has been a case in which the rotation of the driving force transmitting member is not stable.

SUMMARY OF THE INVENTION

The present invention aims to provide a one-way clutch whose driving force transmitting member has preferable rotational stability and reliable functionality, a drive transmission unit using this one-way clutch, and an inkjet printing apparatus using this drive transmission unit.

An embodiment of the present invention for solving the above-described problem is a one-way clutch that is slidably fitted together by insertion a fixed shaft member, the one-way clutch including: a driving force input member; a driving force output member; and a driving force transmitting member that is movable in a thrust direction between the driving force input member and the driving force output member, wherein the driving force transmitting member includes: a plurality of biasing parts that bias the driving force transmitting member against the fixed shaft member; a first engaging part; and a first ratchet engaging part, wherein the driving force input member includes a second engaging part that is engageable with the first engaging part, wherein the driving force output member includes a second ratchet engaging part that is engageable with the first ratchet engaging part, wherein, when the driving force input member performs forward rotation, the second engaging part thereby performs the forward rotation, wherein, when the second engaging part performs the forward rotation in a state of being engaged with the first engaging part, the second engaging part thereby moves the driving force transmitting member to one side of the thrust direction, so that the second engaging part connects the first ratchet engaging part to the second ratchet engaging part, wherein, in a case where the first ratchet engaging part is in a state of being connected to the second ratchet engaging part, when the driving force input member performs the forward rotation, the driving force input member thereby makes the driving force output member perform the forward rotation, further, wherein, when the driving force input member performs reverse rotation, the second engaging part thereby performs the reverse rotation, wherein, when the second engaging part performs the reverse rotation in the state of being engaged with the first engaging part, the second engaging part thereby makes the driving force transmitting member perform the reverse rotation, wherein, when the driving force transmitting member performs the reverse rotation, the first ratchet engaging part thereby performs the reverse rotation, wherein, when the first ratchet engaging part performs the reverse rotation, the first ratchet engaging part thereby moves to another side of the thrust direction so as to be separated from the second ratchet engaging part, and wherein, in a case wherein the first ratchet engaging part is in a state of being separated from the second ratchet engaging part, when the driving force input member performs the reverse rotation, the driving force input member do not makes the driving force output member perform the reverse rotation.

Further features of the present invention will become apparent from the following description of exemplary embodiments with reference to the attached drawings.

BRIEF DESCRIPTION OF THE DRAWINGS

FIG. 8A1 represents a cross-sectional view taken along the cross-sectional line of VIIIA1-VIIIA1 of FIG. 6A in a case where the one-way clutch is in the separated state;

FIG. 8A2 represents a cross-sectional view taken along the cross-sectional line of VIIIA2-VIIIA2 of FIG. 6B in a case where the one-way clutch is in the separated state;

FIG. 8A3 represents a developed view taken along the cross-sectional line of VIIIA3-VIIIA3 of FIG. 6B in a case where the one-way clutch is in the separated state;

FIG. 8B1 represents a cross-sectional view taken along the cross-sectional line of VIIIB1-VIIIB1 of FIG. 6A in a case where the one-way clutch is in a transition state;

FIG. 8B2 represents a cross-sectional view taken along the cross-sectional line of VIIIB2-VIIIB2 of FIG. 6B in a case where the one-way clutch is in the transition state;

FIG. 8B3 represents a developed view taken along the cross-sectional line of VIIIB3-VIIIB3 of FIG. 6B in a case where the one-way clutch is in the transition state;

FIG. 8C1 represents a cross-sectional view taken along the cross-sectional line of VIIIC1-VIIIC1 of FIG. 6A in a case where the one-way clutch is in the connected state;

FIG. 8C2 represents a cross-sectional view taken along the cross-sectional line of VIIIC2-VIIIC2 of FIG. 6B in a case where the one-way clutch is in the connected state;

FIG. 8C3 represents a developed view taken along the cross-sectional line of VIIIC3-VIIIC3 of FIG. 6B in a case where the one-way clutch is in the connected state;

FIG. 9A1 represents a cross-sectional view taken along the cross-sectional line of IXA1-IXA1 of FIG. 6A in a case where the one-way clutch is in the connected state;

FIG. 9A2 represents a cross-sectional view taken along the cross-sectional line of IXA2-IXA2 of FIG. 6B in a case where the one-way clutch is in the connected state;

FIG. 9A3 represents a developed view taken along the cross-sectional line of IXA3-IXA3 of FIG. 6B in a case where the one-way clutch is in the connected state;

FIG. 9B1 represents a cross-sectional view taken along the cross-sectional line of IXB1-IXB1 of FIG. 6A in a case where the one-way clutch is in the transition state;

FIG. 9B2 represents a cross-sectional view taken along the cross-sectional line of IXB2-IXB2 of FIG. 6B in a case where the one-way clutch is in the transition state;

FIG. 9B3 represents a developed view taken along the cross-sectional line of IXB3-IXB3 of FIG. 6B in a case where the one-way clutch is in the transition state;

FIG. 9C1 represents a cross-sectional view taken along the cross-sectional line of IXC1-IXC1 of FIG. 6A in a case where the one-way clutch is in the separated state;

FIG. 9C2 represents a cross-sectional view taken along the cross-sectional line of IXC2-IXC2 of FIG. 6B in a case where the one-way clutch is in the separated state; and FIG. 9C3 represents a developed view taken along the cross-sectional line of IXC3-IXC3 of FIG. 6B in a case where the one-way clutch is in the separated state.

DESCRIPTION OF THE EMBODIMENTS

Hereinafter, a detailed explanation is given of embodiments of the present invention with reference to the drawings. The embodiments explained below exemplify forms in which the present invention is specifically implemented. Therefore, the configurations of the embodiments explained below are to be appropriately modified or changed depending on the configuration of the apparatus to which the present invention is applied and on various conditions, and the present invention is not limited to the embodiments below.

<About Terminology>

In the description of the present specification and the scope of the patent claims, the "image" indicates an image, a design, a pattern, or the like. In the description of the present specification and the scope of the patent claims, the "print medium" is not limited to paper (envelopes, etc.) used for general printing apparatuses and broadly indicates a cloth, plastic film, metal plate, glass, ceramics, wooden material, leather, etc., that can accept ink. In the description of the present specification and the scope of the patent claims, "printing" indicates forming an image on a print medium or processing a print medium. In the description of the present specification and the scope of the patent claims, "ink" indicates liquid that is applied onto a print medium, so as to be possibly used for printing or processing of ink (for example, coagulation or insolubilization of a colorant in the ink applied to the print medium). In the description of the present specification and the scope of the patent claims, "forward rotation" and "reverse rotation" refer to rotation directions different from each other when viewed in the direction of the rotation axis, and either "forward rotation" or "reverse rotation" indicates "counterclockwise rotation" and the other indicates "clockwise rotation". In the description of the present specification and the scope of the patent claims, the "clutch-connected state" indicates a state in which the driving force transmitting member is connected to the driving force output member, so that the rotation from the driving force input member to the driving force output member is transmitted. In the description of the present specification and the scope of the patent claims, the "clutch-separated state" indicates a state in which the driving force transmitting member is separated from the driving force output member, so that the rotation from the driving force input member to the driving force output member is released.

Embodiment

Figure 1:
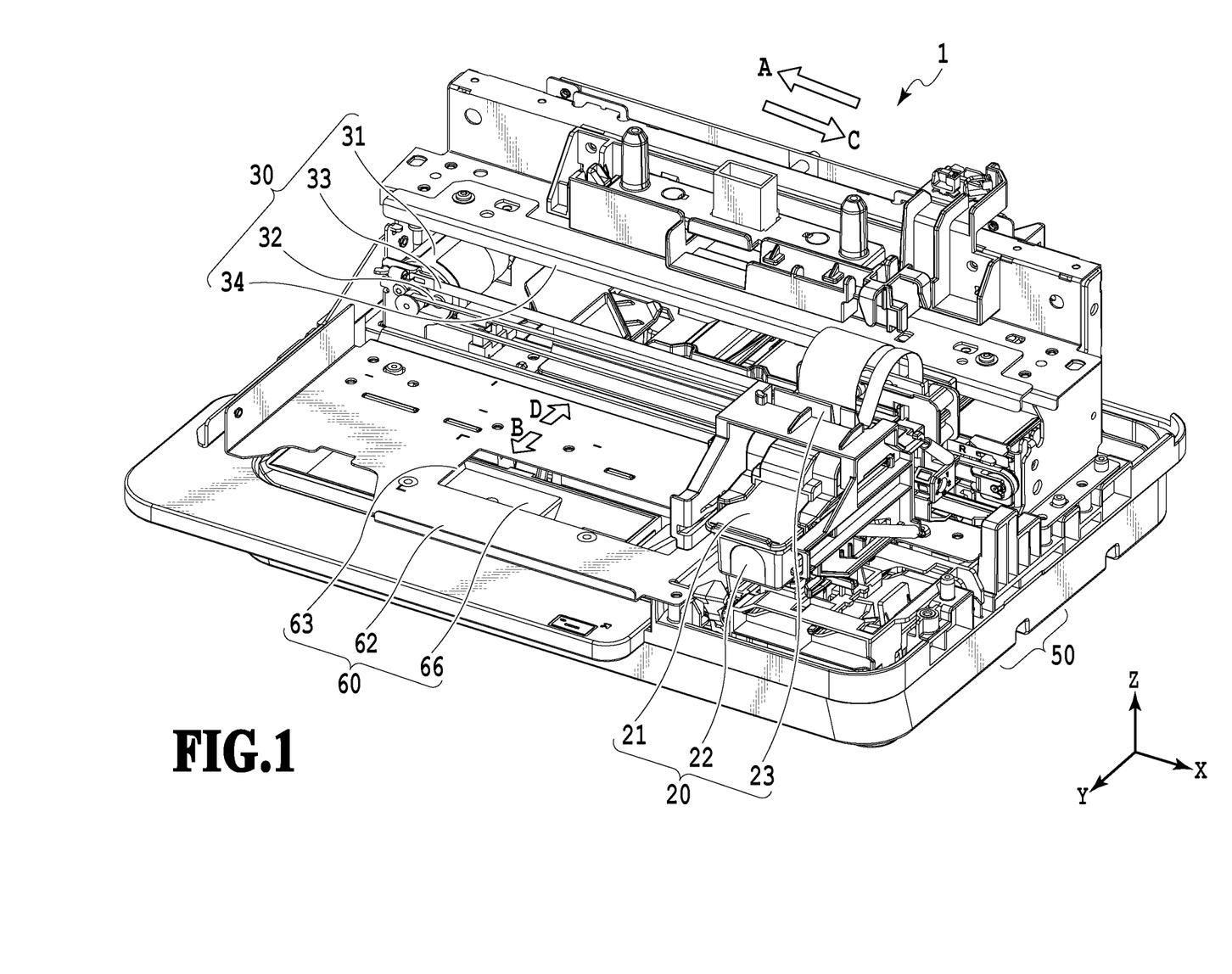
FIG. 1 is a perspective view illustrating a main part of an inkjet printing apparatus, which is an example that employs a one-way clutch according to an embodiment of the present invention.

FIG. 1 is a perspective view illustrating a main part of an inkjet printing apparatus (which may hereinafter be referred to as a "printing apparatus") 1, which is an example that employs the one-way clutch 16 (see FIG. 3) according to an embodiment of the present invention. Here, the X-axis direction indicates the main-scanning direction, the Y-axis direction is orthogonal to the X-axis direction and indicates the sub-scanning direction, and the Z-axis direction is orthogonal to the X-axis direction and Y-axis direction and indicates the direction perpendicular to a print medium (not illustrated in the drawing). The white left-arrow A in the drawing indicates the main-scanning direction of the forward path of the print head 22. The white right-arrow C in the drawing indicates the main-scanning direction of the backward path of the print head 22. The white down-arrow B in the drawing represents the forward sub-scanning direction of the print head 22. The white up-arrow D in the drawing represents the backward sub-scanning direction of the print head 22.

<Inkjet Printing Apparatus>

Figure 3:
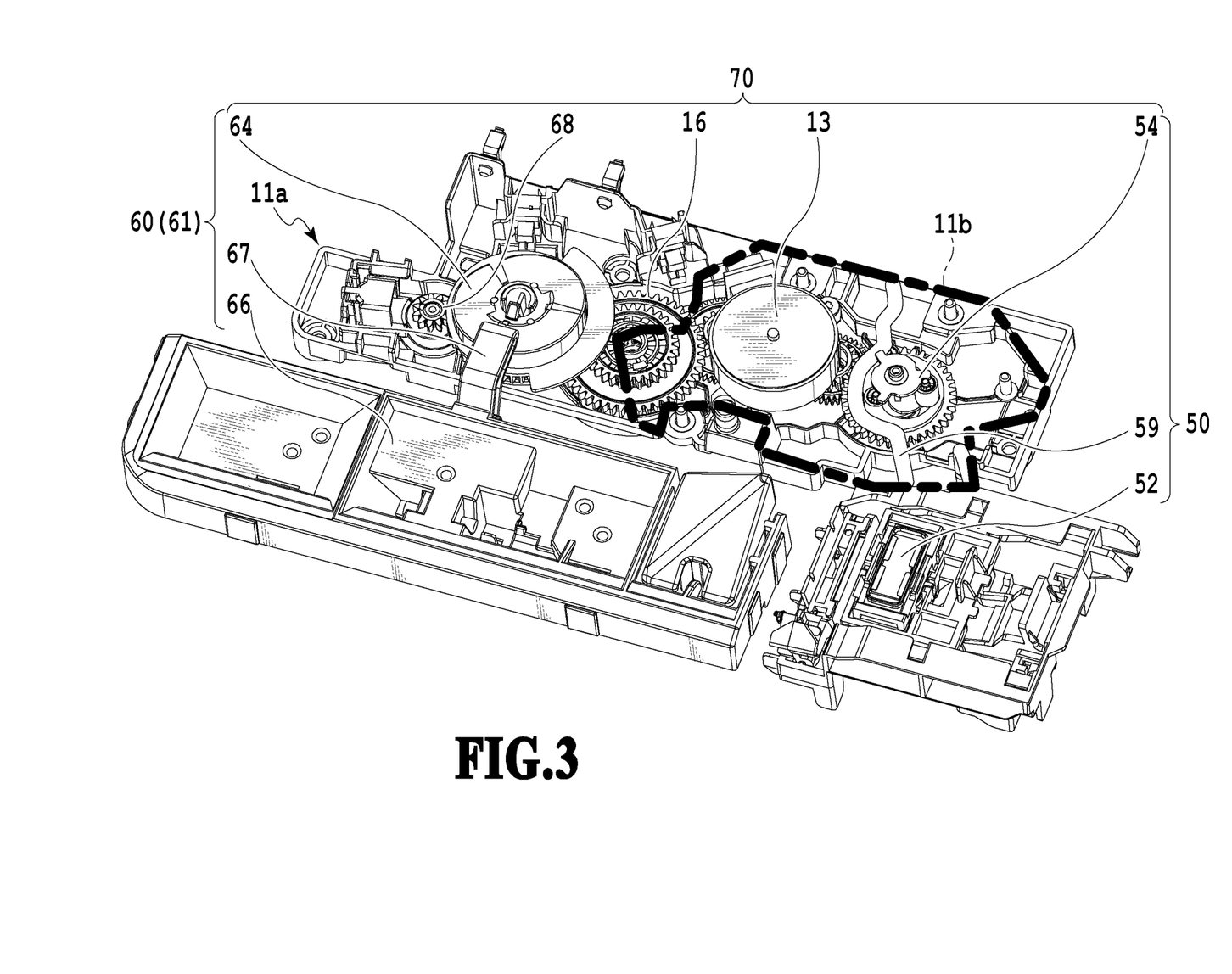
FIG. 3 is a perspective view illustrating a drive transmission unit of the inkjet printing apparatus illustrated in FIG. 1.

The printing apparatus 1 includes a carriage unit 20, a carriage drive part 30 that drives the carriage unit 20, a recovery unit 50, a paper feed unit 60, a main body control unit (not illustrated in the drawing) that controls the printing apparatus 1, and a drive transmission unit 70 (see FIG. 3). Hereinafter, the above-described components will be explained in order.

<Carriage Unit>

The carriage unit 20 includes a print head 22, a print head unit 21 that is held by the print head 22, a carriage 23 on which the print head unit 21 is mounted, and a shift bar (not illustrated in the drawing). With this shift bar, in a case where the carriage 23 moves up to the ends of the range of movement of the main-scanning direction A of the forward path and the main-scanning direction C of the backward path, the print head 22 is shifted inside the carriage 23 by a predetermined amount in either of the forward sub-scanning direction B and the backward sub-scanning direction D. Further, in the print head 22, multiple arrays of print elements (not illustrated in the drawing) configured with a nozzle part (not illustrated in the drawing), which ejects ink that is supplied from an ink tank (not illustrated in the drawing), and a heater 104 (see FIG. 2), which is disposed inside the nozzle part, are arranged along the sub-scanning direction.

<Carriage Drive Part>

The carriage drive part 30 includes a carriage motor 31 and an endless drive belt 32 which is driven by the carriage motor 31, so as to move the carriage 23 in the main-scanning direction A of the forward path and the main-scanning direction C of the backward path. Further, the carriage drive part 30 further includes a linear scale 33, which is used for detecting the position of the carriage 23, and a guide part 34, which defines the movement path of the carriage 23, in the operation area of the carriage unit 20.

Although a DC motor is used as the carriage motor 31 in the present embodiment, the carriage motor 31 is not limited as such, and any means that is a driving force source which can transmit the driving force to the belt, such as a stepping motor, may be used. Further, although a linear encoder is used as the detection means of the carriage unit 20 in the present embodiment, the detection means is not limited as such, and any means having a position detection function, such as a rotary encoder, a stepping motor, or a transmission-type sensor, may be used.

<Recovery Unit>

As illustrated in FIG. 3, the recovery unit 50 includes a cap member 52 and a pump unit 54, which is a negative pressure generation means, and is disposed at a home position, which is located at one end of the range of movement of the carriage 23. The pump unit 54, which is a negative pressure generation means in the present embodiment, employs a tube pump system and further includes a waste storage tank (not illustrated in the drawing) for collecting ink and a tube 59. This recovery unit 50 includes a capping means, which prevents ink from sticking to the nozzle part of the print head 22 and prevents foreign matters from adhering to the nozzle part, and a cleaning means, which recovers the ejection performance of the nozzle of the print head 22. This capping means is for making the cap member 52 come into contact with the ink ejection surface of the print head 22. Further, the cleaning means makes the cap member 52 come into contact with the ink ejection surface and then generates negative pressure inside the cap member 52 by use of the pump unit 54 and the tube 59, so that waste ink, dust that has been mixed in, or the like, is discharged to the waste storage tank.

<Paper Feed Unit>

The paper feed unit 60 includes a paper feed mechanism 61 (see FIG. 3) and a platen member 62 having an opening 63. The paper feed mechanism 61 includes a paper feed tray 66 that supports a print medium from the lower surface, a lift member 64 (see FIG. 3) having a cam sliding surface on the upper surface, and a cam follower 67 (see FIG. 3) of which one end is pressed toward the cam sliding surface of the lift member 64 via a spring and the other end is connected to the paper feed tray 66. When the lift member 64 rotates in one direction, the paper feed mechanism 61 thereby lifts and lowers the paper feed tray 66 via the cam follower 67. Here, the part of the print medium exposed from the opening 63 of the platen member 62 when the paper feed tray 66 is lifted is the area in which printing can be performed by the print head 22.

<Main Body Control Unit>

Figure 2:
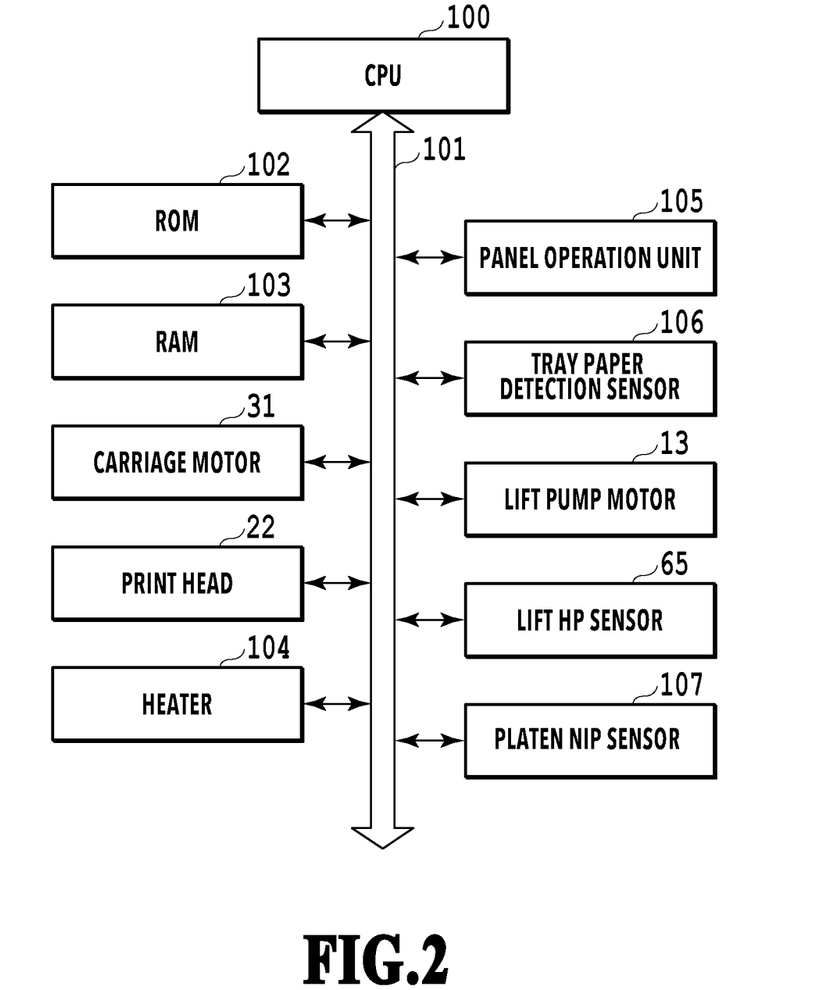
FIG. 2 is a block diagram for explaining a configuration of a control system of the inkjet printing apparatus illustrated in FIG. 1.

The main body control unit of the printing apparatus 1 will be explained with reference to FIG. 2. The CPU 100 is an arithmetic processing unit that performs comprehensive control, such as reception of print data of the printing apparatus 1, paper feeding operation, printing operation, and recovery operation, via a data bus and a system bus 101. The CPU 100 is communicably connected to the ROM 102, the RAM 103, the panel operation unit 105, the tray paper detection sensor 106, the lift pump motor 13, the lift HP sensor 65, and the platen nip sensor 107. The ROM 102 stores image data to be printed, a control program and information for implementing the operation of the present embodiment, etc. The RAM 103 is used as a working memory in accordance with a program stored in the ROM 102. The panel operation unit 105 inputs commands such as displaying a status of the printing apparatus 1 and a printing operation from the user. The lift pump motor 13 is a pulse motor capable of performing forward rotation and reverse rotation. As will be described in detail later, this lift pump motor 13 is used as the same driving source for driving the paper feed mechanism 61 (see FIG. 3) and the pump unit 54 (see FIG. 3) via the drive transmission unit 70 (see FIG. 3). Note that the lift pump motor 13 in the present embodiment is configured with a pulse motor but is not limited as such.

As an operation process before printing, upon detecting with the tray paper detection sensor 106 that a print medium is set in the paper feed tray 66, the CPU 100 drives the lift pump motor 13 so as to perform forward rotation. Then, upon detecting with the lift HP sensor 65 that the paper feed tray 66 has started being lifted and further detecting with the platen nip sensor 107 that the print medium has been held between the paper feed tray 66 and the platen member 62, the CPU 100 stops the lift pump motor 13.

Next, as an operation process during printing, the CPU 100 drives the carriage motor 31 to move the carriage unit 20 in the main-scanning direction A and the main-scanning direction C. Here, upon detecting that the print head 22 has reached the position for starting printing, the CPU 100 heats the heater 104 inside the print head 22 in accordance with image signals and ejects ink onto the print medium, so that one continuous image configured with images of the forward path and images of the backward path is printed on the print medium.

Further, as will be described in detail later, as a cleaning operation process, the CPU 100 drives the lift pump motor 13 so as to perform forward rotation and reverse rotation, so that an operation of causing the pump unit 54 (see FIG. 3) to be released to the atmosphere and an operation of generating negative pressure for ink are executed.

<Drive Transmission Unit>

Figure 4A:
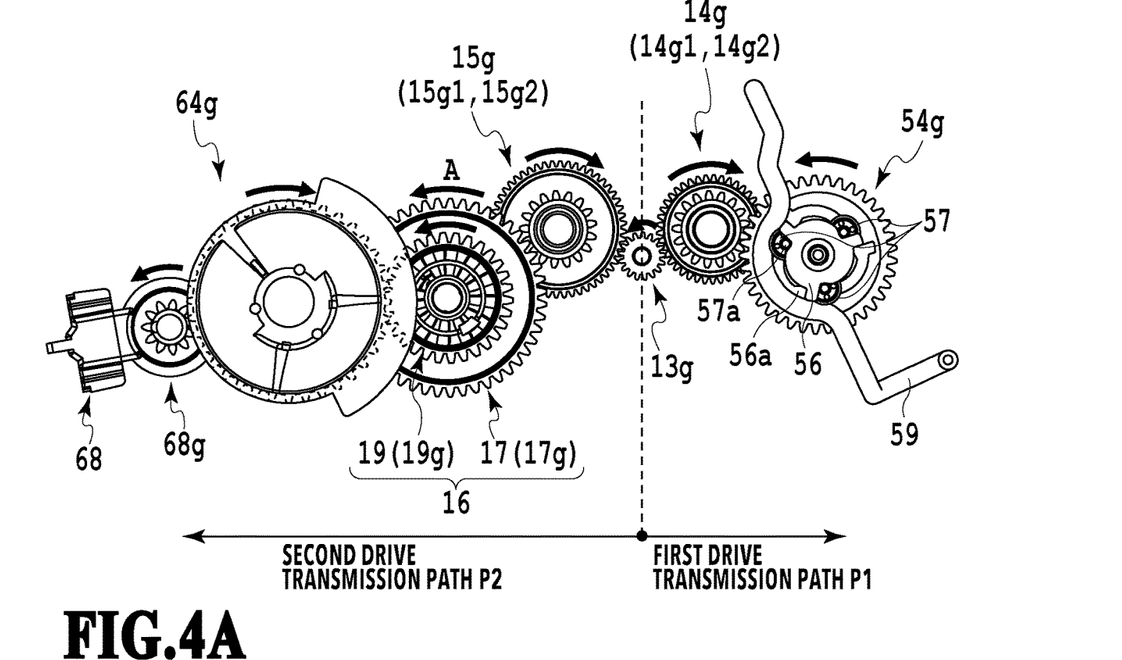
FIG. 4A is a diagram for explaining two drive transmission paths of the drive transmission unit illustrated in FIG. 3, where the one-way clutch is in a connected state.
Figure 4B:
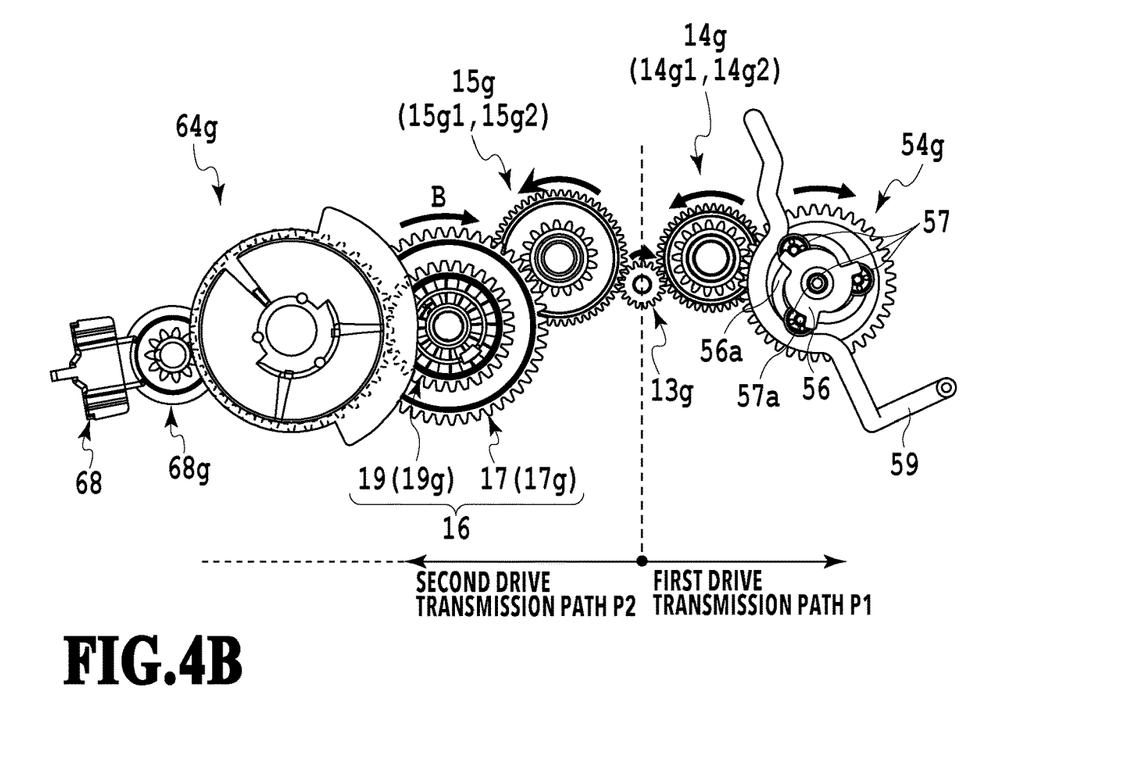
FIG. 4B is a diagram for explaining the two drive transmission paths of the drive transmission unit illustrated in FIG. 3, where the one-way clutch is in a separated state.

FIG. 3 is a perspective view illustrating the drive transmission unit 70. FIG. 4A is a diagram for explaining two drive transmission paths P1 and P2 of the drive transmission unit 70, where the one-way clutch 16 is in a connected state. FIG. 4B is a diagram for explaining the two drive transmission paths P1 and P2 of the drive transmission unit 70, where the one-way clutch 16 is in a separated state. Here, as for the drive transmission unit in FIG. 3, the outer shape of the pump base 11b is indicated by the broken line for convenience of explanation. Further, as for the rotation direction of each gear in FIG. 4A and FIG. 4B, for the sake of explanation, "counterclockwise" which is indicated by the black arrow A indicates "forward rotation", and "clockwise" which is indicated by the black arrow B indicates "reverse rotation".

The drive transmission unit 70 is accommodated in the drive transmission unit case 11a and is configured with the lift pump motor 13, the one-way clutch 16, the pump unit 54, the lift member 64, and the cam brake 68. This drive transmission unit 70 is capable of operating two drive-target bodies (driving of the pump unit 54 and lifting/lowering operation of the paper feed tray 66) with driving force from one driving source (lift pump motor 13) via the first drive transmission path P1 and the second drive transmission path P2. This first drive transmission path P1 transmits the driving force, which is input to the lift pump motor gear 13g, to the pump gear 54g via the large diameter part 14g1 and the small diameter part 14g2 of the first drive gear 14g. Further, the second drive transmission path P2 transmits the driving force, which is input to the lift pump motor gear 13g, to the lift gear 64g via the large diameter part 15g1 and the small diameter part 15g2 of the second drive gear 15g and the driving force input gear 17g and the driving force output gear 19g of the one-way clutch 16.

Here, the pump unit 54 includes a rotor 56, multiple pump roller guide grooves 56a disposed in the rotor 56, and multiple pump rollers 57 having shaft parts 57a that are movably inserted to the pump roller guide grooves 56a. The pump roller guide grooves 56a extend along the forward rotation direction so as to gradually get away from the rotation center in the radial direction and are disposed at equal intervals in the circumferential direction.

(When the Lift Pump Motor Performs Forward Rotation: The First Drive Transmission Path)

In the first drive transmission path P1, as illustrated in FIG. 4A, when the lift pump motor 13 is made to perform forward rotation (counterclockwise), the driving force that is input to the lift pump motor gear 13g is transmitted to the pump gear 54g via the first drive gear 14g. Here, by making the rotor 56 of the pump unit 54 perform forward rotation, the pump rollers 57 perform relative movement in the pump roller guide grooves 56a. Accordingly, the pump unit 54 shifts from a negative pressure generating state, in which the tube 59 is closed, to an atmosphere open state, in which the pressure in the tube 59 is partially released.

(When the Lift Pump Motor Performs Forward Rotation: The Second Drive Transmission Path)

In the second drive transmission path P2, as illustrated in FIG. 4A, when the lift pump motor 13 is made to perform forward rotation (counterclockwise), the driving force that is input to the lift pump motor gear 13g is transmitted to the lift gear 64g via the second drive gear 15g and the one-way clutch 16. That is, the one-way clutch 16 is in the clutch-connected state. Here, by making the lift member 64 perform reverse rotation to make the one end of the cam follower 67 slide on the cam sliding surface of the lift member 64, the paper feed tray 66 connected to the other end of the cam follower 67 is lifted and lowered.

(When the Lift Pump Motor Performs Reverse Rotation: The First Drive Transmission Path)

In the first drive transmission path P1, as illustrated in FIG. 4B, when the lift pump motor 13 is made to perform reverse rotation (clockwise), the driving force that is input to the lift pump motor gear 13g is transmitted to the pump gear 54g via the first drive gear 14g. Here, by making the rotor 56 of the pump unit 54 perform reverse rotation, the pump rollers 57 perform relative movement in the pump roller guide grooves 56a. Accordingly, the pump unit 54 shifts from the atmosphere open state, in which the pressure in the tube 59 is partially released, to the negative pressure generating state, in which the tube 59 is closed.

(When the Lift Pump Motor Performs Reverse Rotation: The Second Drive Transmission Path)

In the second drive transmission path P2, as illustrated in FIG. 4B, when the lift pump motor 13 is made to perform reverse rotation (clockwise), the driving force that is input to the lift pump motor gear 13g is not transmitted to the lift gear 64g via the one-way clutch 16. That is, the one-way clutch 16 is in the clutch-separated state. Here, since the lift member 64 is in a non-rotating state, the paper feed tray 66 is stationary.

Here, when the one-way clutch 16 is in the clutch-separated state, the lift gear 64g is in the non-rotating state and connected to the driving force output gear 19g in a no-load state. However, a downward pressing force is constantly applied to the cam sliding surface of the lift member 64 via the one end of the cam follower 67. Therefore, depending on the stop position of the lift member 64, the lift member 64 may unintentionally rotate, which causes a collision noise of the paper feed tray 66. Therefore, in order to maintain the non-rotating state of the lift member 64, the cam brake 68 that is capable of applying a predetermined torque is adopted, and a cam brake gear 68g of the cam brake 68 is connected to the lift gear 64g.

<About the One-Way Clutch>

Figure 5A:
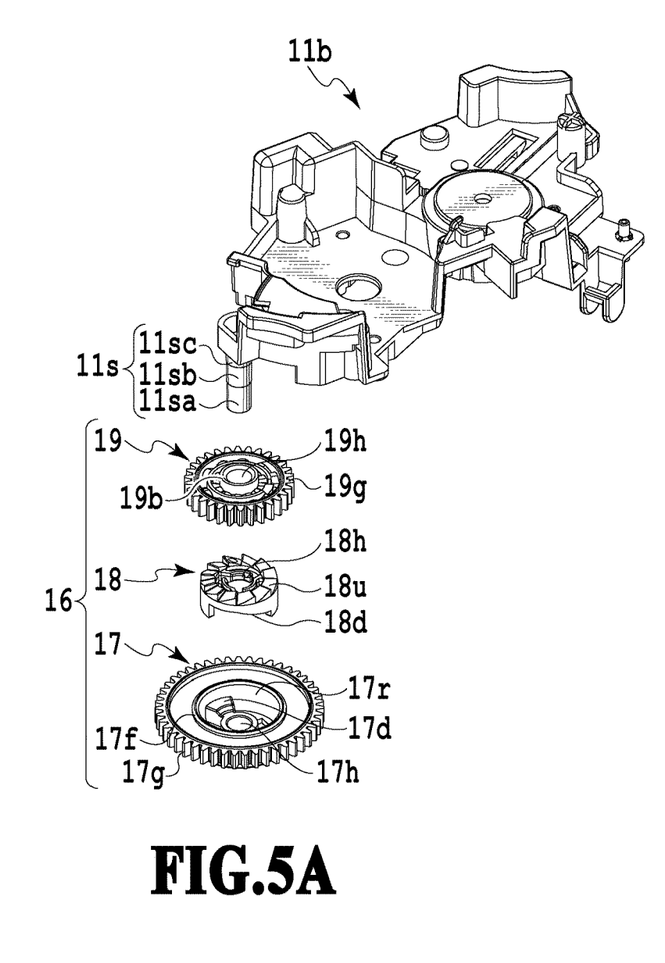
FIG. 5A is an exploded perspective view of the one-way clutch arranged on the pump base illustrated in FIG. 3 as viewed from above.
Figure 5B:
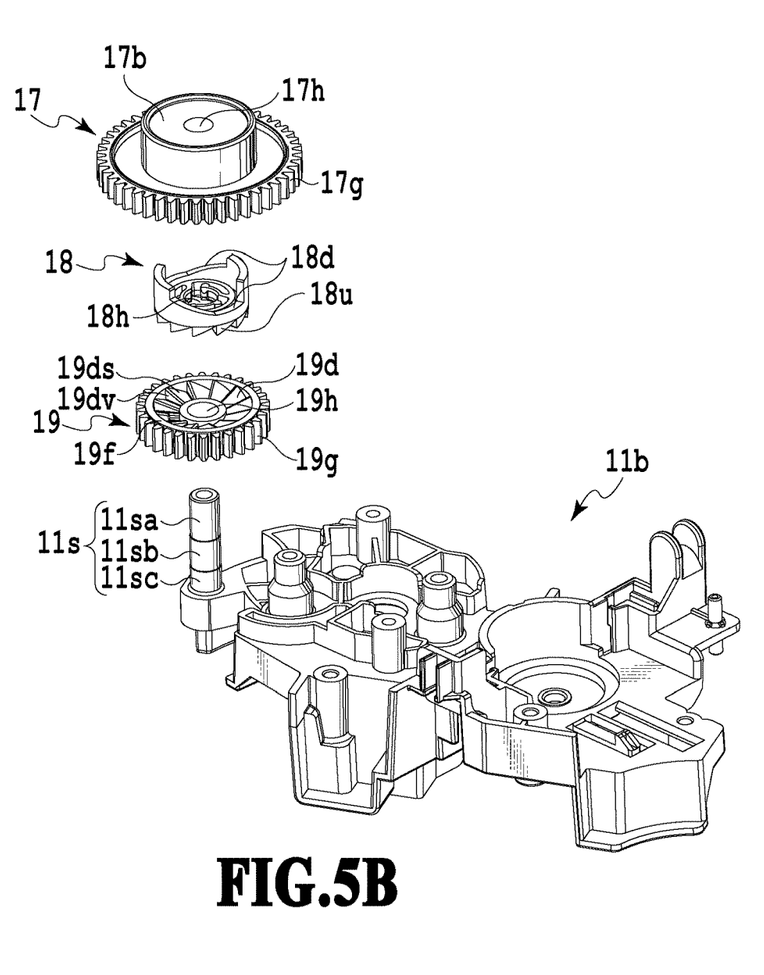
FIG. 5B is an exploded perspective view of the one-way clutch arranged on the pump base illustrated in FIG. 3 as viewed from below.
Figure 6A:
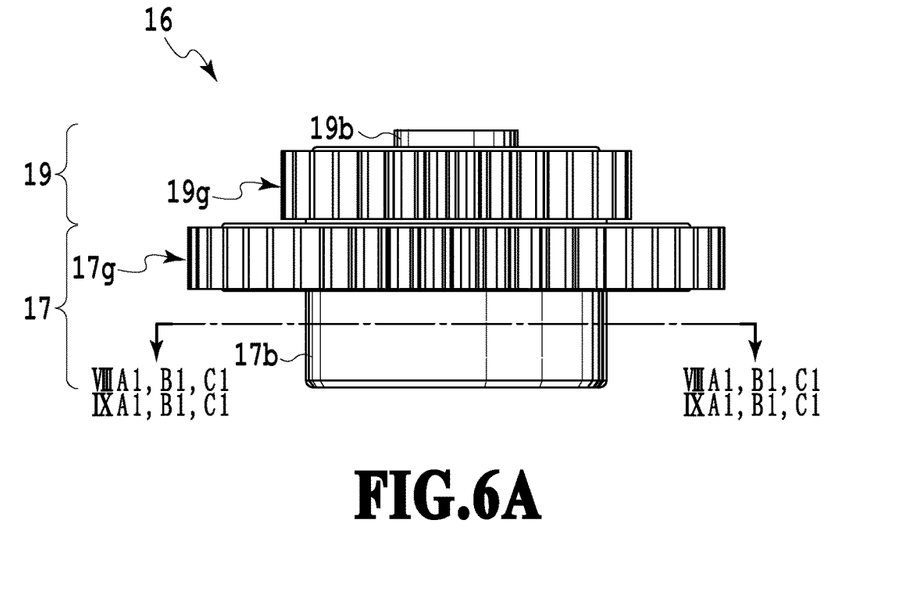
FIG. 6A is a side view of the one-way clutch illustrated in FIG. 5A and FIG. 5B.
Figure 6B:
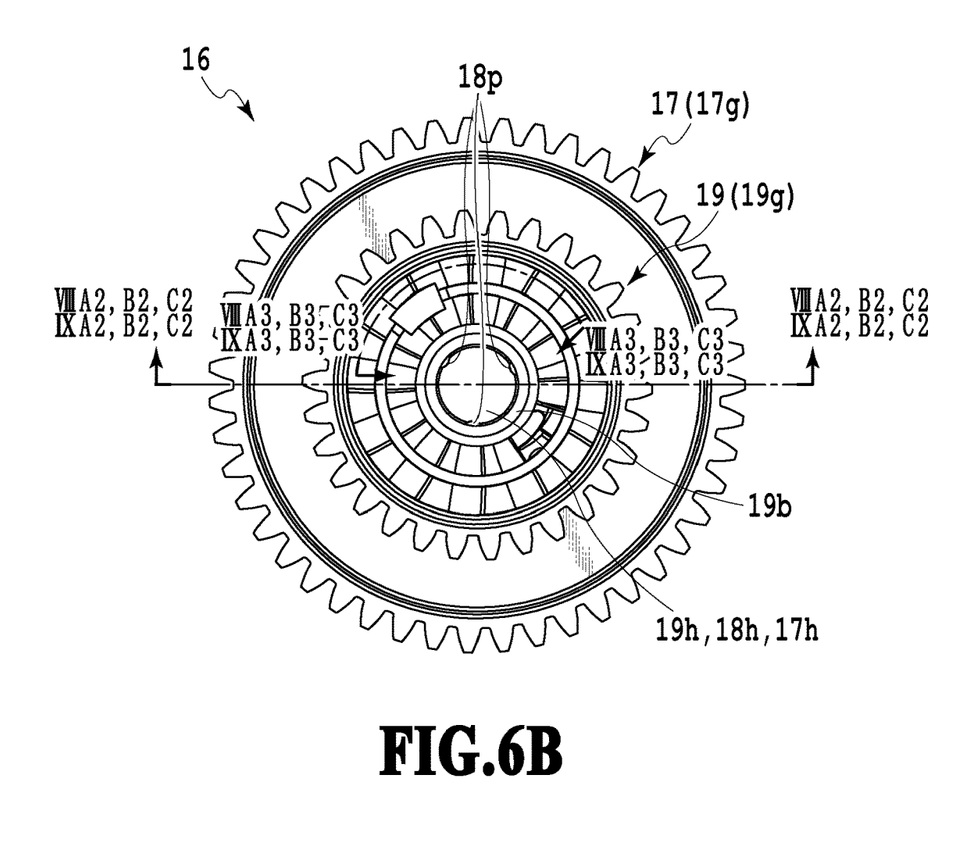
FIG. 6B is a top view of the one-way clutch illustrated in FIG. 5A and FIG. 5B.
Figure 7A:
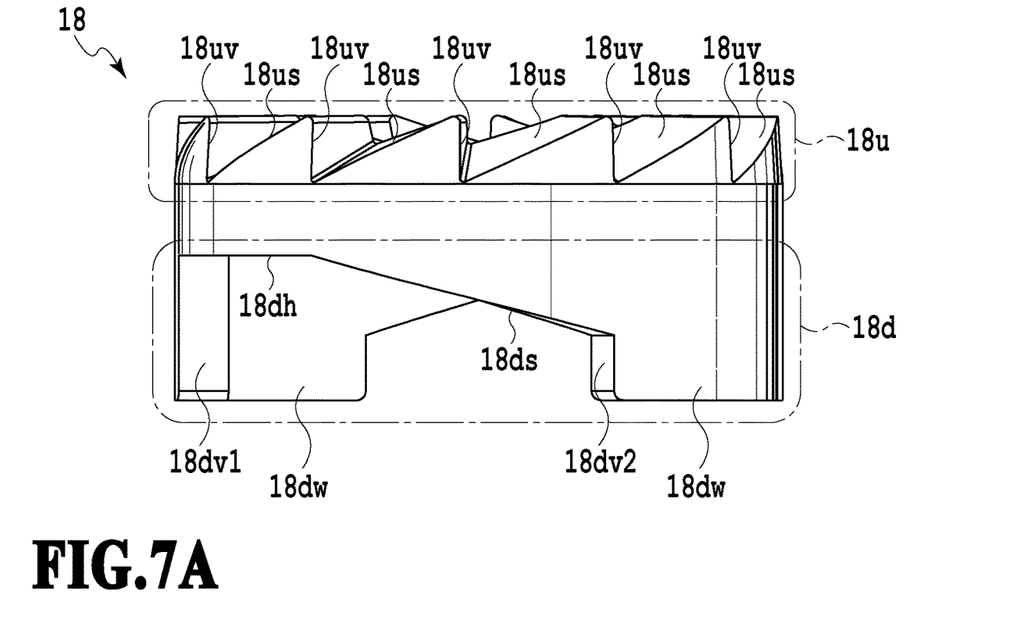
FIG. 7A is a side view of the driving force transmitting member illustrated in FIG. 5A and FIG. 5B.
Figure 7B:
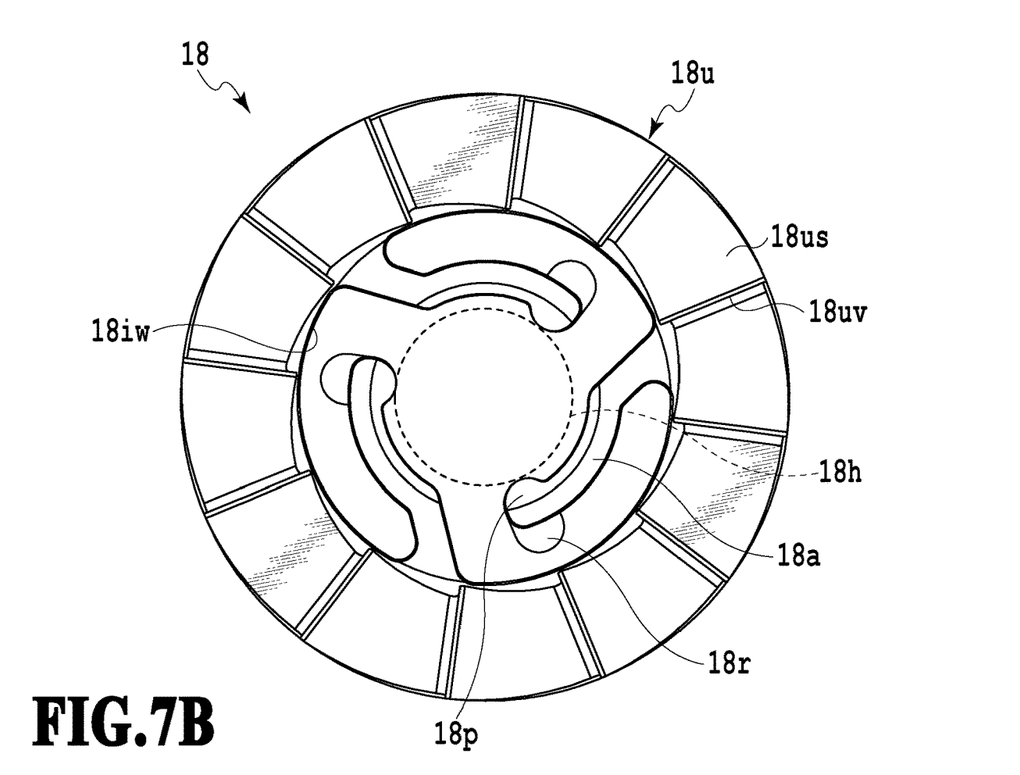
FIG. 7B is a top view of the driving force transmitting member illustrated in FIG. 5A and FIG. 5B.

FIG. 5A and FIG. 5B are exploded perspective views of the one-way clutch 16 arranged on the pump base 11b as viewed from above and below. FIG. 6A and FIG. 6B are a side view and a top view of the one-way clutch 16. FIG. 7A and FIG. 7B are a side view and a top view of the driving force transmitting member 18. Here, the one-way clutch 16 is disposed so that the rotation center line thereof extends in the vertical direction. Further, as will be described in detail later, the upward thrust movement and the downward thrust movement of the driving force transmitting member 18 are caused by different mechanisms.

The one-way clutch 16 includes a driving force input member 17, a driving force transmitting member 18, and a driving force output member 19. Hereinafter, the above-described components will be explained in order. Here, the one-way clutch 16 is slidably fitted together by insertion a fixed shaft member 11s, which is integrally disposed on the pump base 11b, so as to be held between the pump base 11b and the drive transmission unit case 11a. This fixed shaft member 11s is in a cylindrical shape having three different outer diameters. The diameters of the fixed shaft member 11s are set so as to become larger stepwise from the lower tip part to the upper parts, that is, in the order of the first fixed shaft part 11sa, the second fixed shaft part 11sb, and the third fixed shaft part 11sc. Note that, although the fixed shaft member 11s in the present embodiment is disposed integrally with the pump base 11b, the embodiment is not limited as such, and it is also possible that the fixed shaft member 11s is provided separately from the pump base 11b. Further, although the driving force input member 17, the driving force transmitting member 18, and the driving force output member 19 in the present embodiment are formed of resin, this is not an essential requirement, and, for example, it is also possible that the driving force input member 17, the driving force transmitting member 18, and the driving force output member 19 are formed of metal, ceramics, etc.

<Driving Force Input Member>

The driving force input member 17 has a two-step cylindrical shape configured with the driving force input gear 17g and a boss part 17b. Further, the driving force input member 17 includes a shaft-inserting part 17h, which is a through-hole along the central axis, and a recess part 17r, which is disposed inside the boss part 17b and has a cylindrical shape that is open on the upper surface side. Furthermore, the driving force input member 17 includes an annular flat part 17f, which is disposed on the upper surface part so as to surround the recess part 17r, and a pair of protrusion parts 17d (second engaging part), which is disposed so as to vertically rise from the bottom part of the recess part 17r and have the shaft-inserting part 17h therebetween (see FIG. 8A1 through FIG. 9A2, FIG. 9B1, FIG. 9B2, FIG. 9C1, and FIG. 9C2).

Here, in order to regulate the upward thrust movement of the driving force input member 17, the inner diameter of the shaft-inserting part 17h of the driving force input member 17 is set to be larger than the outer diameter of the first fixed shaft part 11sa and smaller than the outer diameter of the second fixed shaft part 11sb. Further, in order to regulate the downward thrust movement of the driving force input member 17, the boss part 17b of the driving force input member 17 is constantly made to come into contact with the drive transmission unit case 11a. Here, the lengths of the shaft-inserting part 17h and the first fixed shaft part 11sa in the thrust direction are set to be the same.

<Driving Force Transmitting Member>

The driving force transmitting member 18 has an approximately cylindrical shape with a lid and includes a shaft-inserting part 18h (see the broken line in FIG. 7B), which is a through-hole along the central axis. Further, the driving force transmitting member 18 includes a pair of lower-end-side engaging parts 18d (first engaging part), which has side-wall parts 18dw (see FIG. 7A) on the lower side so as to have the shaft-inserting part 18h therebetween, and an upper-end-side ratchet engaging part 18u (first ratchet engaging part), which is disposed on the upper end side.

First, as for the pair of lower-end-side engaging parts 18d, a first vertical part 18dv1, a horizontal part 18dh, a slope part 18ds, and a second vertical part 18dv2 are continuously formed along the rotation direction A (see FIG. 8B3) as respective cam surfaces. Here, the height of the second vertical part 18dv2 is lower than that of the first vertical part 18dv1. Although the slope parts 18ds in the present embodiment are in a linear shape, the present embodiment is not limited as such, and, for example, it is also possible that the slope parts 18ds are in a curved-surface shape or a combination of a linear shape and a curved-surface shape. Here, as will be described in detail later, the pair of protrusion parts 17d, which is disposed on the driving force input member 17, are accommodated and engaged with this pair of lower-end-side engaging parts 18d, respectively. Further, as for the upper-end-side ratchet engaging part 18u, continuous multiple (for example, 12) claw parts, each of which is configured with a slope surface part 18us and a vertical surface part 18uv, are formed along the circumferential direction.

Moreover, the driving force transmitting member 18 includes three arm parts 18a (biasing part) with free ends, which are evenly arranged along the circumferential direction of the inner circumferential wall 18iw so as to project toward the center line and extend in the circumferential direction. Since these three arm parts 18a are made of resin, the arm parts 18a have elastic force, and the arm parts 18a include pressure-applying parts 18p on the inner circumferential side of the free ends and regulation parts 18r on the outer circumferential side of the free ends. Here, the shaft-inserting part 18h illustrated with the broken line in FIG. 7B is an inscribed circle of the three pressure-applying parts 18p. By setting the inner diameter of the inscribed circle to be smaller than the second fixed shaft part 11sb, the movement on the second fixed shaft part 11sb in the thrust direction is enabled while generating predetermined bias force applied to the second fixed shaft part 11sb because of the elastic force of the multiple arm parts 18a. Further, since the bias force is evenly applied to the second fixed shaft part 11sb because of the three arm parts 18a, it is possible to stably rotate the driving force transmitting member 18. This makes it possible to reliably implement the separated state and the connected state of the one-way clutch, which will be described later. When the driving force transmitting member 18 moves in the radial direction due to external vibration or the like, the regulation part 18r comes into contact with the inner circumferential wall 18iw, so that the movement is regulated. In addition, the length of the second fixed shaft part 11sb in the thrust direction is set to be longer than the length of the pressure-applying part 18p in the thrust direction.

<Driving Force Output Member>

The driving force output member 19 has a two-step cylindrical shape configured with the driving force output gear 19g and a boss part 19b and includes a shaft-inserting part 19h, which is a through-hole along the central axis, and a lower-end-side ratchet engaging part 19d (second ratchet engaging part), which is disposed on the lower end side. Further, the driving force output member 19 includes an annular flat part 19f, which is disposed on the lower surface side so as to surround the lower-end-side ratchet engaging part 19d.

As illustrated in FIG. 5B, as for the lower-end-side ratchet engaging part 19d, continuous multiple (for example, 12) claw parts, each of which is configured with a slope surface part 19ds and a vertical surface part 19dv, are formed along the circumferential direction. Here, as will be described in detail later, the upper-end-side ratchet engaging part 18u, which is disposed on the upper end side of the driving force transmitting member 18, is engaged with this lower-end-side ratchet engaging part 19d.

Here, in order to regulate the upward thrust movement of the driving force output member 19, the inner diameter of the shaft-inserting part 19h of the driving force output member 19 is set to be larger than the outer diameter of the third fixed shaft part 11sc, and the boss part 19b of the driving force output member 19 is made to constantly come into contact with the pump base 11b. Further, in order to regulate the downward thrust movement of the driving force output member 19, the annular flat part 19f, which is disposed on the lower surface side of the driving force output member 19, is made to constantly come into contact with the annular flat part 17f, which is disposed on the upper surface side of the driving force input member 17. Here, the lengths of the shaft-inserting part 19h and the third fixed shaft part 11sc in the thrust direction are set to be the same.

<Shift of the One-Way Clutch from the Separated State to the Connected State>

FIG. 8A1 to FIG. 8C3 are diagrams for explaining the shift process of the one-way clutch 16, which is illustrated in FIG. 6A and FIG. 6B, from the separated state to the connected state. Here, as will be described in detail later, when the pair of protrusion parts 17d and the pair of lower-end-side engaging parts 18d are engaged with each other, the forward rotation of the driving force input member 17 is thereby converted into upward thrust movement of the driving force transmitting member 18. When the upper-end-side ratchet engaging part 18u and the lower-end-side ratchet engaging part 19d are connected with each other because of this upward thrust movement of the driving force transmitting member 18, the rotation is thereby transmitted from the driving force input member 17 to the driving force output member 19.

(Separated State of the One-Way Clutch)

Figure 8A:
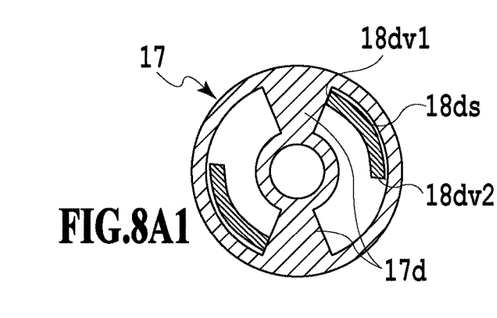
Figure 8A:
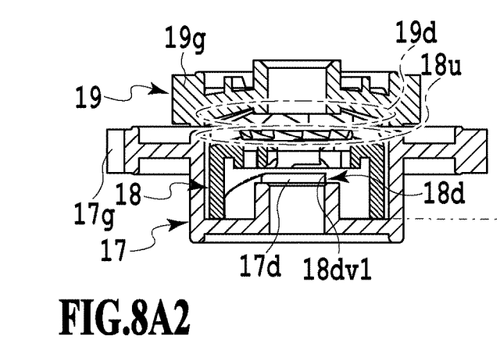
Figure 8A:
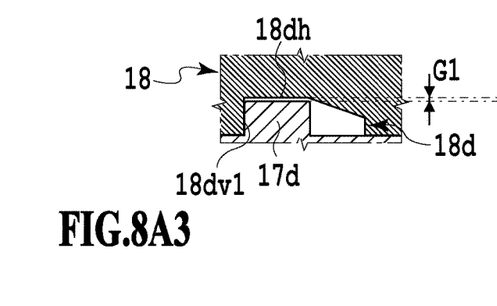

As illustrated in FIG. 8A1 to FIG. 8A3, as for the positional relationship of the driving force transmitting member 18 and the driving force output member 19, the driving force transmitting member 18 and the driving force output member 19 are separated from each other in the thrust direction, and the first ratchet engaging part 18u and the second ratchet engaging part 19d are in an unengaged state. On the other hand, as for the positional relationship of the driving force input member 17 and the driving force transmitting member 18, the bottom part of the recess part 17r and the lower part of the side-wall part 18dw come into contact with each other in the thrust direction, and the protrusion part 17d and the first vertical part 18dv1 come into contact with each other in the circumferential direction. Here, the predetermined gap G1 created between the protrusion part 17d and the horizontal part 18dh is for absorbing an assembly error of the one-way clutch 16 and the like and for preventing the driving force input member 17 from making the driving force transmitting member 18 rotate together with in the circumferential direction. The rotation angle of the driving force input member 17 in this separated state is referred to as 0° (reference).

(Transition State of The One-Way Clutch)

Figure 8B:
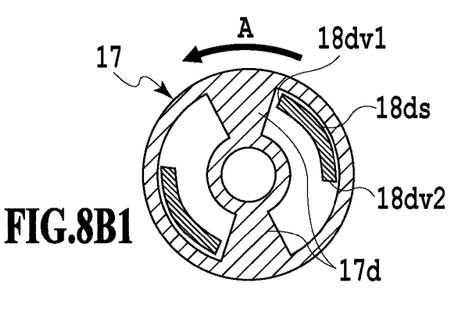
Figure 8B:
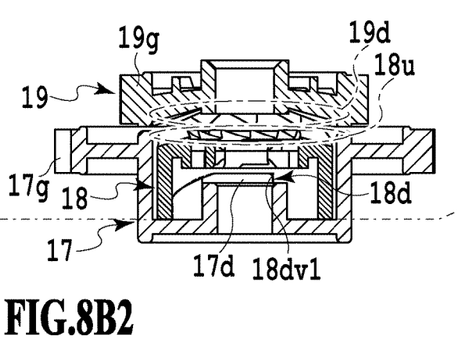
Figure 8B:
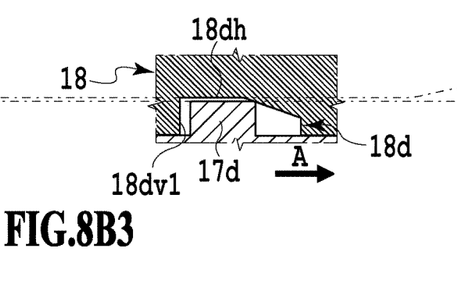

As illustrated in FIG. 8B1 to FIG. 8B3, when the driving force input member 17 is rotated (for example, by 5°) in the rotation direction A (forward rotation), the protrusion part 17d is separated from the first vertical part 18dv1 and moves in a non-contact state with the predetermined gap G1 between the protrusion part 17d and the horizontal part 18dh. Thereafter, the protrusion part 17d starts applying pressure to the slope part 18ds.

The slope of this slope part 18ds is less than 45° relative to the horizontal direction. Therefore, when the protrusion part 17d applies pressure to the slope part 18ds, the load imposed on the driving force transmitting member 18 in the thrust direction is greater than the load imposed on the driving force transmitting member 18 in the rotation direction. Here, the bias force applied to the fixed shaft member 11s by the three arm parts 18a (biasing part) of the driving force transmitting member 18 is set to be greater than the load imposed on the driving force transmitting member 18 in the rotation direction when the protrusion part 17d applies pressure to the slope part 18ds. Further, the bias force applied to the fixed shaft member 11s by the three arm parts 18a (biasing part) of the driving force transmitting member 18 is set to be smaller than the load imposed on the driving force transmitting member 18 in the thrust direction when the protrusion part 17d applies pressure to the slope part 18ds. Moreover, the bias force applied to the fixed shaft member 11s by the three arm parts 18a (biasing part) of the driving force transmitting member 18 is set to be greater than the load due to the own weight of the driving force transmitting member 18. Accordingly, when the protrusion part 17d applies pressure to the slope part 18ds, the driving force transmitting member 18 performs thrust movement only upward. In this way, the driving force transmitting member 18 in the present embodiment is held by the fixed shaft member 11s with predetermined bias force. Therefore, it is possible to prevent the driving force transmitting member 18 from moving to an unintended position due to an influence in the gravity direction, external vibration, or the like, and prevent the one-way clutch 16 from becoming the separated state.

(Connected State of the One-Way Clutch)

Figure 8C:
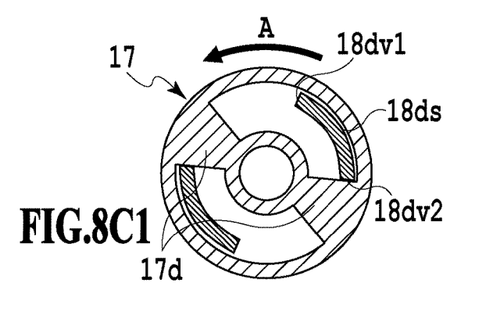
Figure 8C:
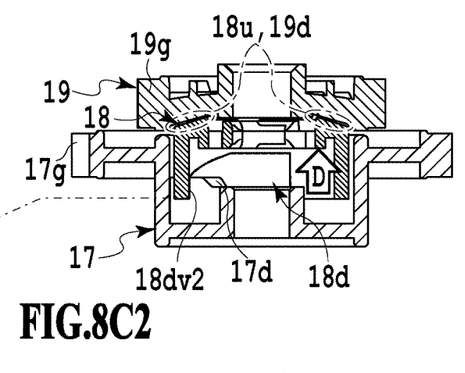
Figure 8C:
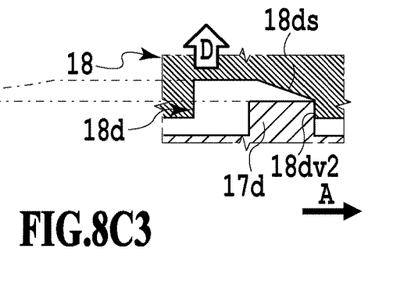

As illustrated in FIG. 8C1 to FIG. 8C3, when the driving force input member 17 is further rotated (for example, by 60°) in the rotation direction A, the protrusion part 17d moves to the second vertical part 18dv2 while sliding on the slope part 18ds. Here, the driving force transmitting member 18 performs thrust movement only upward (see the white arrows D in FIG. 8C2 and FIG. 8C3), so that the first ratchet engaging part 18u and the second ratchet engaging part 19d become an engaged state. Thereafter, when the protrusion part 17d starts applying pressure to the second vertical part 18dv2, the upward thrust movement of the driving force transmitting member 18 ends, and the one-way clutch 16 becomes the connected state. Accordingly, the rotation is transmitted from the driving force input member 17 to the driving force output member 19.

<Shift of the One-Way Clutch from the Connected State to the Separated State>

FIG. 9A1 to FIG. 9C3 are diagrams for explaining the shift process of the one-way clutch 16, which is illustrated in FIG. 6A and FIG. 6B, from the connected state to the separated state. Here, as will be described in detail later, the engagement configured with the first ratchet engaging part 18u and the second ratchet engaging part 19d converts the reverse rotation of the driving force input member 17 into downward thrust movement of the driving force transmitting member 18, so that the first ratchet engaging part 18u and the second ratchet engaging part 19d become the unengaged state. Accordingly, the rotation from the driving force input member 17 to the driving force output member 19 is released.

(Connected State of the One-Way Clutch)

Figure 9A:
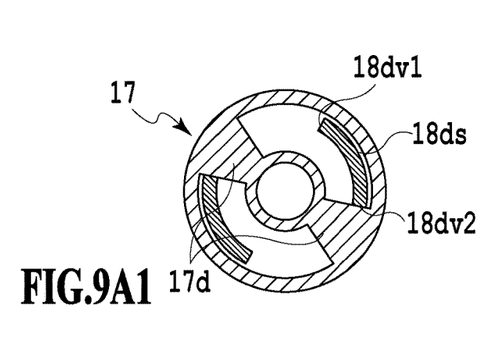
Figure 9A:
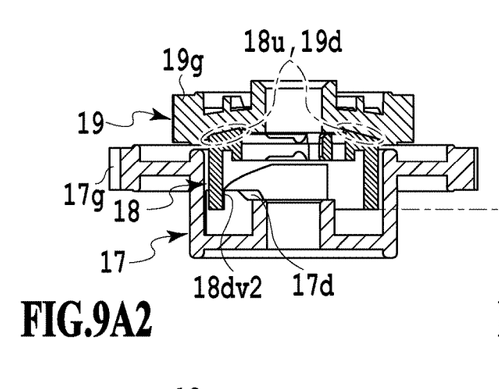
Figure 9A:
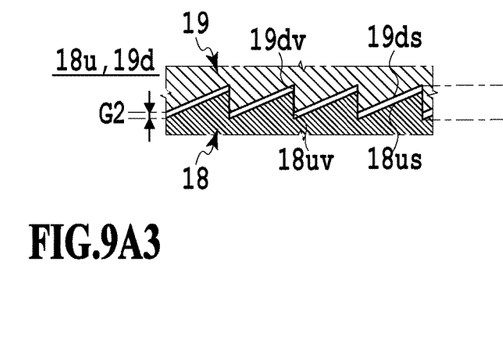

As illustrated in FIG. 9A1 to FIG. 9A3, as for the positional relationship of the driving force transmitting member 18 and the driving force output member 19, the driving force transmitting member 18 and the driving force output member 19 are connected with each other in the thrust direction, and the first ratchet engaging part 18u and the second ratchet engaging part 19d are in the engaged state. On the other hand, as for the positional relationship of the driving force input member 17 and the driving force transmitting member 18, although the driving force input member 17 and the driving force transmitting member 18 are separated from each other in the thrust direction, the protrusion part 17d and the second vertical part 18dv2 come into contact with each other in the circumferential direction, and therefore the second engaging part 17*d* and the first engaging part 18*d* are in the engaged state. When the first ratchet engaging part 18*u* and the second ratchet engaging part 19*d* are in the engaged state, the vertical surface part 18*uv* of the driving force transmitting member 18 and the vertical surface part 19*dv* of the driving force output member 19 come into contact with each other. Here, the predetermined gap G2 created between the slope surface part 18*us* of the driving force transmitting member 18 and the slope surface part 19*ds* of the driving force output member 19 is for absorbing an assembly error of the one-way clutch 16 and the like. The rotation angle of the driving force input member 17 in this connected state is referred to as 0° (reference).

(Transition State of the One-Way Clutch)

Figure 9B:
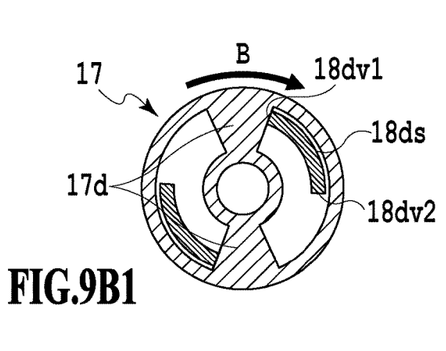
Figure 9B:
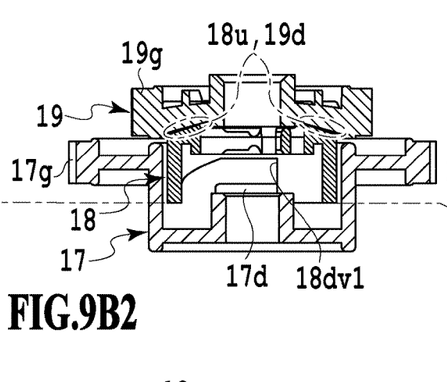
Figure 9B:
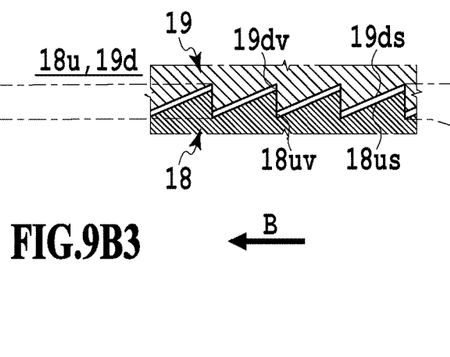

As illustrated in FIG. 9B1 to FIG. 9B3, when the driving force input member 17 is rotated (for example, by 60°) in the rotation direction B (reverse rotation), the protrusion part 17*d* is separated from the second vertical part 18*dv*2. Accordingly, the driving force input member 17 moves in the non-contact state, where the driving force input member 17 is not in contact with the driving force transmitting member 18. In this non-contact state, as described above, since the driving force transmitting member 18 is held by the fixed shaft member 11*s* with the predetermined bias force, it is possible to prevent the driving force transmitting member 18 from moving to an unintended position due to an influence in the gravity direction, external vibration, or the like. Thereafter, the protrusion part 17*d* starts applying pressure to the first vertical part 18*dv*1 (see FIG. 9B1).

When the protrusion part 17*d* starts applying pressure to the first vertical part 18*dv*1, the driving force transmitting member 18 starts rotating in the rotation direction B (reverse rotation) accordingly. Here, as for the ratchet engaging parts 18*u* and 19*d*, the vertical surface part 18*uv* and the vertical surface part 19*dv* are separated from each other, and the slope surface part 18*us* and the slope surface part 19*ds* are slid from each other in the shearing direction. Accordingly, the driving force transmitting member 18 starts downward thrust movement due to the load imposed by the slope surface part 19*ds* in the thrust direction while rotating in the rotation direction B. Here, the driving force output member 19 is in a state where a frictional resistance caused by the boss part 19*b* abutting on the pump base 11*b*, predetermined torque caused by the cam brake 68 via the lift gear 64*g*, etc., are applied. Accordingly, the driving force output member 19 is not made to rotate together with rotation of the driving force transmitting member 18.

(Separated State of the One-Way Clutch)

Figure 9C:
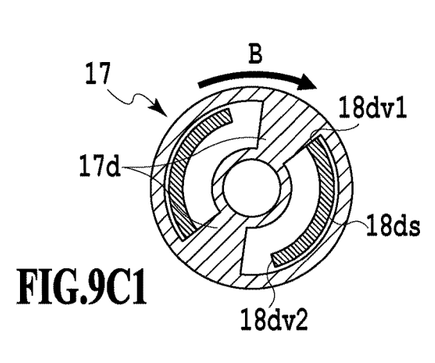
Figure 9C:
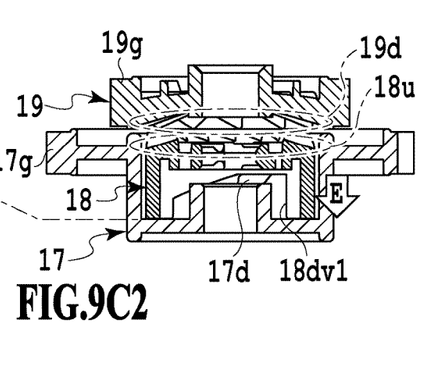
Figure 9C:
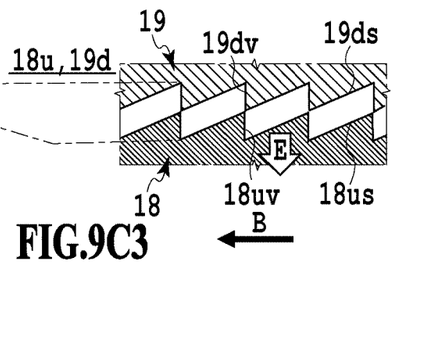

As illustrated in FIG. 9C1 to FIG. 9C3, when the driving force input member 17 is further rotated (for example, by 90°) in the rotation direction B, the slope surface part 18*us* and the slope surface part 19*ds* of the ratchet engaging parts 18*u* and 19*d* are further slid from each other in the shearing direction. Due to this sliding, the driving force transmitting member 18 further performs downward thrust movement to the position where the ratchet engaging parts 18*u* and 19*d* become the unengaged state (see the white arrows E in FIG. 9C2 and FIG. 9C3). Accordingly, the driving force transmitting member 18 and the driving force output member 19 are completely separated from each other in the thrust direction, so that the one-way clutch 16 becomes the separated state, and the rotation from the driving force input member 17 to the driving force output member 19 is released.

When the one-way clutch 16 of the present embodiment is in the separated state, since only the driving force transmitting member 18 is biased to the fixed shaft member 11*s*, the driving force transmitting member 18 and the driving force output member 19 are physically completely separated from each other. Therefore, even if the rotation of the one-way clutch 16 in the rotation direction B (reverse rotation) is continued in this state, the driving force output member 19 does not rotate together with the rotation of the driving force transmitting member 18, so that the one-way clutch 16 can reliably function.

Other Embodiments

In the above-described embodiment, three arm parts 18*a* are adopted as the biasing part of the driving force transmitting member 18 acting on the fixed shaft member 11*s*. However, the biasing part in the present embodiment may be any type as long as the biasing part is capable of applying predetermined bias force to the fixed shaft part, and, for example, it is also possible that an arm part made of a metal leaf spring is disposed separately from the driving force transmitting member or formed integrally with the driving force transmitting member by insert molding. Further, it is also possible that the number of arm parts is two, and, in this case, it is preferable that the respective arm parts are arranged symmetrically with respect to the center of the rotation axis. Further, in the case where there are three arm parts, it is preferable that the respective arm parts are evenly arranged in the circumferential direction of the rotation axis. However, the present invention is not limited as such, and it is only needed, for example, that the rotation center is arranged to be inside the triangle connecting the pressure-applying parts 18*p* of the three arm parts when the driving force transmitting member is viewed in the rotation axis direction. Further, although the rotation center line of the one-way clutch 16 is arranged so as to extend in the vertical direction in the above implementation example, it is also possible that the rotation center line is arranged so as to extend in the horizontal direction.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2020-030664, filed Feb. 26, 2020, and No. 2021-002888, filed Jan. 12, 2021, which are hereby incorporated by reference wherein in their entirety.

What is claimed is:

1. A one-way clutch that is slidably fitted together by insertion of a fixed shaft member, the one-way clutch comprising:
   a driving force input member;
   a driving force output member; and
   a driving force transmitting member that is movable in a thrust direction between the driving force input member and the driving force output member,
   wherein the driving force transmitting member includes: a plurality of biasing parts that bias the driving force transmitting member against the fixed shaft member; a first engaging part; and a first ratchet engaging part,
   wherein the driving force input member includes a second engaging part that is engageable with the first engaging part,
   wherein the driving force output member includes a second ratchet engaging part that is engageable with the first ratchet engaging part, wherein when the driving force input member performs forward rotation, the second engaging part thereby performs the forward rotation, wherein, when the second engaging part performs the forward rotation in a state of being engaged with the first engaging part, the second engaging part thereby moves the driving force transmitting member to one side of the thrust direction, so that the second engaging part connects the first ratchet engaging part to the second ratchet engaging part, wherein, in a case where the first ratchet engaging part is in a state of being connected to the second ratchet engaging part, when the driving force input member performs the forward rotation, the driving force input member thereby makes the driving force output member perform the forward rotation, further, wherein, when the driving force input member performs reverse rotation, the second engaging part thereby performs the reverse rotation, wherein, when the second engaging part performs the reverse rotation in the state of being engaged with the first engaging part, the second engaging part thereby makes the driving force transmitting member perform the reverse rotation, wherein, when the driving force transmitting member performs the reverse rotation, the first ratchet engaging part thereby performs the reverse rotation, wherein, when the first ratchet engaging part performs the reverse rotation, the first ratchet engaging part thereby moves to another side of the thrust direction so as to be separated from the second ratchet engaging part, and wherein, in a case where the first ratchet engaging part is in a state of being separated from the second ratchet engaging part, when the driving force input member performs the reverse rotation, the driving force input member does not makes the driving force output member perform the reverse rotation.

2. The one-way clutch according to claim 1, wherein the biasing parts are at least three arm parts that are arranged along an inner circumferential part of the driving force transmitting member.

3. The one-way clutch according to claim 2, wherein the three arm parts include pressure-applying parts, which are respectively disposed at tips of the three arm parts so as to apply pressure to the fixed shaft member, and a rotation center of the driving force transmitting member is arranged so as to be inside a triangle connecting the three pressure-applying parts.

4. The one-way clutch according to claim 1, wherein the first engaging part includes a pair of cam surfaces that are continuously formed with a first vertical part, a horizontal part, a slope part, and a second vertical part in that order, and the second engaging part includes a pair of protrusion parts having a height that is shorter than the first vertical part and taller than the second vertical part.

5. A drive transmission unit including
the one-way clutch according to claim 1,
a lift pump motor,
a pump gear connected to a pump unit, and
a lift gear connected to a lift member,
the drive transmission unit comprising:
a first drive transmission path configured to transmit driving force from the lift pump motor to the pump unit via the pump gear; and
a second drive transmission path configured to transmit driving force from the lift pump motor to the lift member via the one-way clutch and the lift gear.

6. An inkjet printing apparatus comprising the drive transmission unit according to claim 5,
wherein, when the lift pump motor rotates in one direction, the pump unit is driven via the first drive transmission path in a state of being released to an atmosphere, and the lift member is driven via the second drive transmission path since rotation is transmitted by the one-way clutch, and
wherein, when the lift pump motor rotates in another direction, the pump unit is driven via the first drive transmission path in a state where negative pressure is generated, and the lift member is not driven via the second drive transmission path since the rotation is released by the one-way clutch.

\* \* \* \* \*